US012766437B2

(12) United States Patent
Davis

(10) Patent No.: US 12,766,437 B2
(45) Date of Patent: Oct. 20, 2026

(54) INSTALLED SEPARATION APPARATUS, SYSTEM AND METHOD OF USE

(71) Applicant: Ross Davis, Houston, TX (US)

(72) Inventor: Ross Davis, Houston, TX (US)

( * ) Notice: Subject to any disclaimer, the term of this patent is extended or adjusted under 35 U.S.C. 154(b) by 378 days.

(21) Appl. No.: 18/429,641

(22) Filed: Feb. 1, 2024

(65) Prior Publication Data

US 2024/0261706 A1 Aug. 8, 2024

Related U.S. Application Data

(60) Provisional application No. 63/443,374, filed on Feb. 4, 2023, provisional application No. 63/443,127, filed on Feb. 3, 2023.

(51) Int. Cl.

| | |
|---|---|
| ***B01D 17/02*** | (2006.01) |
| ***B01D 17/12*** | (2006.01) |
| ***B01D 21/24*** | (2006.01) |
| ***C02F 1/40*** | (2023.01) |
| *C02F 101/32* | (2006.01) |
| *C02F 103/10* | (2006.01) |

(52) U.S. Cl.

CPC ......... *B01D 17/0214* (2013.01); *B01D 17/12* (2013.01); *B01D 21/2444* (2013.01); *C02F 1/40* (2013.01); *C02F 2101/32* (2013.01); *C02F 2103/10* (2013.01)

(58) Field of Classification Search

CPC ................ B01D 17/0214; B01D 17/12; B01D 21/2444; E02B 15/10; E02B 15/106; C02F 1/40; C02F 2101/32; C02F 2103/10

See application file for complete search history.

(56) References Cited

U.S. PATENT DOCUMENTS

| | | | | |
|---|---|---|---|---|
| 1,450,545 A | | 4/1923 | Hans | |
| 2,330,508 A | | 9/1943 | Mccoll | |
| 2,670,848 A | * | 3/1954 | Van Houten ............ | E02B 15/10 422/256 |
| 3,690,463 A | | 9/1972 | Obrien | |
| 3,693,800 A | | 9/1972 | Stanfield | |
| 3,722,687 A | | 3/1973 | Stebbins | |
| 3,727,765 A | * | 4/1973 | Henning, Jr. ........... | E02B 15/10 210/776 |
| 3,753,492 A | * | 8/1973 | Aiello ................... | E02B 15/106 210/776 |
| 3,901,811 A | * | 8/1975 | Finch ...................... | B09C 1/002 210/538 |
| 4,695,376 A | * | 9/1987 | Astrom .............. | B01D 21/0027 210/523 |
| 4,728,440 A | * | 3/1988 | van Kuijeren ..... | B01D 17/0214 210/744 |
| 4,867,872 A | | 9/1989 | Russell | |
| 5,118,412 A | | 6/1992 | Schmidt | |
| 5,693,218 A | | 12/1997 | Yamamoti | |
| 5,897,773 A | * | 4/1999 | Rhodes .............. | B01D 17/0208 210/232 |

(Continued)

*Primary Examiner* — Liam Royce

(57) ABSTRACT

A separator apparatus, system and method is provided to be installed into a containment area and is operable to separate a less dense upper liquid layer from on top of a denser lower liquid layer. The separator apparatus includes a skimmer vessel and a height adjustment assembly to set the vessel's vertical position such that it is partially submerged within the fluid and preferentially receives the less dense fluid.

19 Claims, 8 Drawing Sheets

(56) References Cited

U.S. PATENT DOCUMENTS

| | | | | |
|---|---|---|---|---|
| 6,905,611 | B2 * | 6/2005 | Gustafsson | B01D 17/0214<br>210/776 |
| 7,025,888 | B2 | 4/2006 | Thompson | |
| 9,194,094 | B1 | 11/2015 | Sobel | |
| 10,550,536 | B2 | 2/2020 | Murakami | |
| 11,478,729 | B2 | 10/2022 | Davis | |
| 2023/0014402 | A1 | 1/2023 | Davis | |

* cited by examiner

INSTALLED SEPARATION APPARATUS, SYSTEM AND METHOD OF USE

CROSS REFERENCE TO RELATED APPLICATIONS

This application claims priority and benefit from U.S. Provisional Patent Application No. 63/443,127 filed on Feb. 3, 2023, entitled "Permanently Installed Separation Apparatus, System and Method of Use," and U.S. Provisional Patent Application No. 63/443,347 filed on Feb. 4, 2023, also entitled "Permanently Installed Separation Apparatus, System and Method of Use." The contents of both applications are hereby incorporated in their entirety herein by reference.

BACKGROUND OF THE INVENTION

Technical Field

Embodiments of the subject matter disclosed herein generally relate to systems, devices and methods for skimming and recovery of a less dense fluid floating over a denser fluid by installing a skimming device into a containment area.

Discussion of the Background

Production operations in the oil and gas industry is the term which generally refers to the stage at which the hydrocarbons are drawn from the subsurface. Once at the surface, the material is transferred, treated and stored at the well site location or in a field installation for future transport to a refinery or pumping station. Many oil fields produce at certain times a multiphase fluid which may be a mix of saltwater and oil which needs to be separated and disposed of properly to avoid surface and groundwater contamination.

As part of the process of separation and treatment of the saltwater-oil mix, some amount of oil may accumulate in tanks designated as saltwater tanks and needs to be removed. The fluid is generally collected at a central station including one or more saltwater tanks. From here, the saltwater may be picked up and transported to another location for disposal which typically is a well specifically designed to accept saltwater waste fluids. Alternatively, the saltwater fluid produced at the field level may be directly connected to a saltwater disposal well located onsite. In this case, the saltwater is typically transferred via a pipeline or gathering lines running from the saltwater tanks to the disposal well and the waste saltwater is then pumped into a subterranean formation permitted for that purpose.

It is deleterious to the permeability of the injection zone in which the waste saltwater flows to have contaminants in the saltwater fluids. Contaminants could include organic material, precipitated solids, oil, or oil by-products. Thus, the removal of oil from the saltwater stored in the saltwater tanks is important so that no oil is injected which could reduce the injection zone's capacity in the saltwater disposal well.

Further, contaminants and precipitates formed in the oil can cause damage to injector pumps and related equipment used for saltwater disposal purposes. Damage to the equipment and reduced saltwater well injection capacity from oil and other oil contaminants pumped into a disposal well results in higher cost of production for oil and gas operators. In addition, waste saltwater can be produced in such large volumes that storage capacity is very limited and contaminant oil thus take up valuable volume and add costs. Also, malfunctions of equipment and sensors can result in spills and spillovers of liquids stored in saltwater tanks including oil which then require cleanup at the tank secondary containment area, commonly referred to as the "firewall" or other areas outside the containment area. In certain states, spills over a certain amount must be reported to the applicable regulatory agency which could result in fines and other penalties.

Currently, if saltwater in a storage tank is contaminated with an oil layer, or an oil-water mix is spilled into a containment or other area, specialized personnel and pumper trucks are required to remove and dispose the contaminated fluid from the tank, firewall or other area. This is a costly and time-consuming process. Therefore, there is a need for an apparatus and method to economically remove oil which accumulates in the upper level of tanks intended to store waste saltwater as well as from containment and other areas in the event of a spill. There is a further need for permanently or long term installed devices to conduct such fluid removal.

SUMMARY OF EXAMPLE EMBODIMENTS

According to an embodiment, a separation apparatus for removing a volume of less dense fluid from the top of a denser volume of fluid is disclosed. The apparatus includes a vessel to contain a fluid with a closed bottom and a top open to receive fluid into the vessel; a pump in fluid communication with the vessel; and a height adjustment assembly comprising a vertical member coupled to the vessel and configured to adjust the vertical position of the vessel. When in use the separation apparatus is in use, a volume of less dense fluid from on top a denser fluid flows into the vessel and said less dense fluid is pumped out of the vessel by the pump.

According to another embodiment, a separation apparatus for removing a volume of less dense fluid from the top of a denser volume of fluid is disclosed. The apparatus includes a vessel to contain a fluid with a closed bottom and a top open to receive fluid into the vessel; a pump in fluid communication with the vessel; a fluid conduit assembly comprising a vertical drive shaft connected to the pump at a first end and connected at the second end to an impeller assembly having an inlet intake and a discharge conduit wherein the impeller assembly is located within the volume of the vessel; and a height adjustment assembly comprising a vertical member coupled to the vessel and configured to adjust the vertical position of the vessel. When the separation apparatus is in use, a volume of less dense fluid from on top a denser fluid flows into the vessel and said less dense fluid is pumped out of the vessel by the pump and fluid conduit assembly.

According to yet another embodiment, a separation system for removing a volume of less dense fluid from the top of a denser volume of fluid is disclosed. The system includes a separator apparatus comprising a vessel to contain a fluid with a closed bottom and a top open to receive fluid into the vessel; a pump in fluid communication with the vessel; a height adjustment assembly comprising a vertical member coupled to the vessel and configured to adjust the vertical position of the vessel; a collection tank; a discharge conduit configured to discharge fluid from the vessel to the collection tank; a control system comprised of a computer implemented controller configured to receive at least one sensor input associated with the separator apparatus and output at least one control signal. When the separation system is in use, the central control system adjusts the height of the vessel such that a volume of less dense fluid from on top a denser fluid flows into the vessel and activates the pump to withdraw the less dense fluid out of the vessel based upon at least one input command.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF EXAMPLES OF THE INVENTION

The following description of the embodiments refers to the accompanying drawings. The same reference numbers in different drawings identify the same or similar elements. The following detailed description does not limit the invention but is intended to provide exemplary description of devices, systems and methods. The following embodiments are discussed, for simplicity, with regard to devices, systems and methods to remove a low-density fluid from on top of a higher density fluid, for example oil from water. However, the embodiments discussed herein are not limited to such elements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. The drawings are intended to be illustrative of the claimed features and unless stated otherwise are not to scale. Where a dimension of a given feature may be pertinent, the detailed description will indicate one or more examples of the range and units of said dimension where needed to enable the subject matter. Further, the described features, structures or characteristics may be combined in any suitable manner in one or more embodiments.

The inventive technology disclosed herein allows for a less dense liquid to be removed while the less dense liquid is floating on top of a denser liquid in a container or containment area. This prevents the less dense fluid from coating the inside surface area of the container (tank, area or reservoir) as would occur if the liquid in the container were drained from at or near the bottom of the container. In the case of an oil layer on a water layer, the oil layer on top can be removed and recovered, and the water layer at the bottom can be drained from the container base. U.S. Pat. No. 11,478,729 and pending U.S. Patent Application Publication US2023/0014402 both owned by the current applicant and incorporated herein for all purposes discloses mobile devices, systems and methods of removing a less dense fluid from a denser fluid.

Figure 1A:
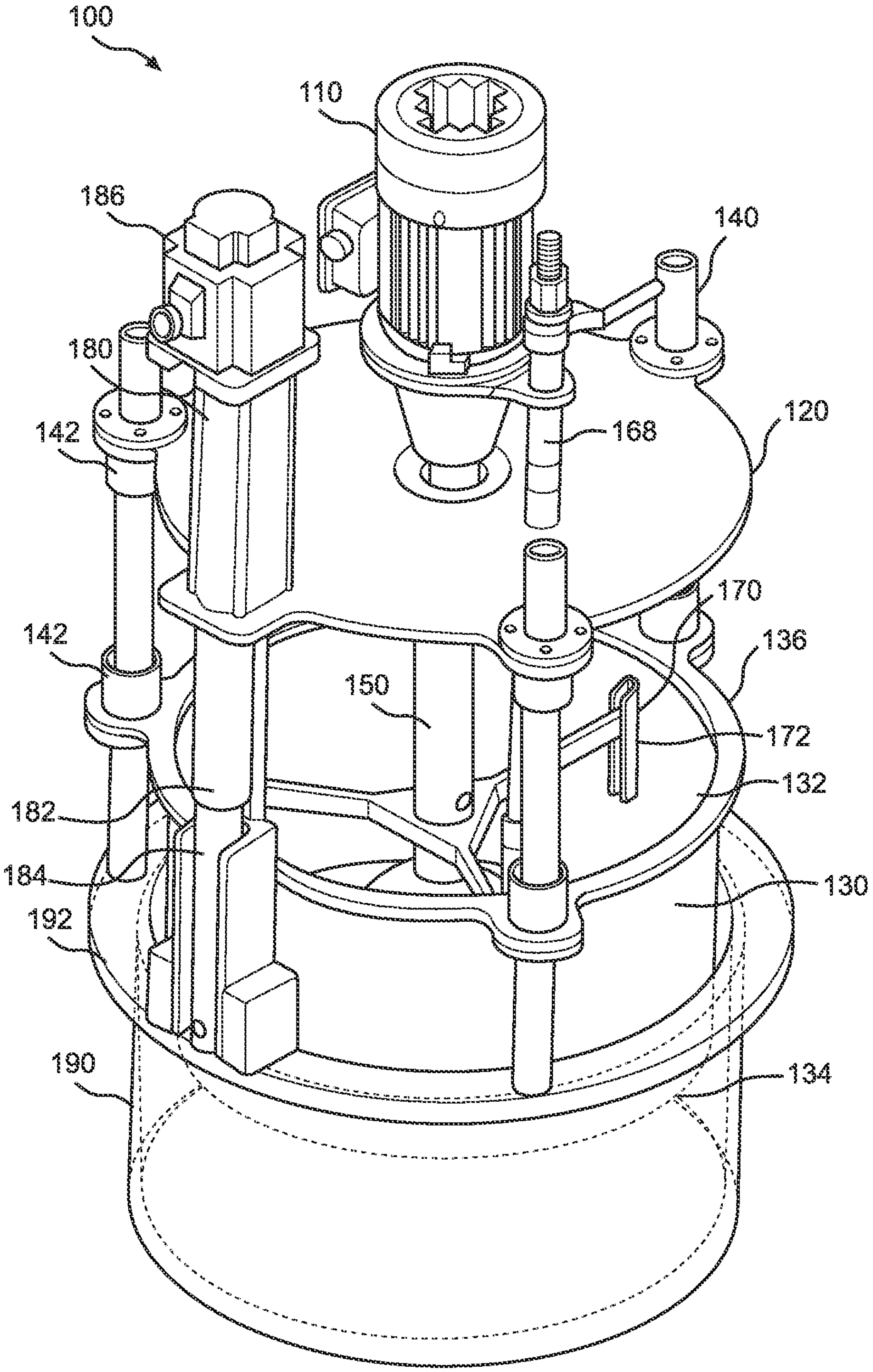
FIG. 1A shows an exemplary separator apparatus with a vertical pump and a sump receptacle.

An exemplary long-term, permanent or semi-permanently installed apparatus 100 for removing a low-density fluid that floats above a higher density fluid, e.g., oil from water, from reservoirs or containment areas is shown in FIG. 1A. The main components of the apparatus include a pump 110 mounted to a flat mounting plate 120 and configured to withdraw a lesser dense fluid that spills into a vessel 130 that is vertically position such that the immiscible less dense fluid (e.g., oil) selectively flows into the vessel 130. In this embodiment, vessel 130 has a cylindrical shape of a prescribed volume e.g., 5 gallons, 10 gallons or more, and an open top 132 and a closed bottom 134.

In certain preferred embodiments, and as shown, pump 110 is a vertical sump pump affixed in a vertical orientation to mounting plate 120, but the pump may include a standard sump pump, other centrifugal, or peristaltic, or other suitable pump type sized dependent on system requirements, e.g., vessel 130 volume as well as desired flow rate, discharge pressure etc.

Figure 1B:
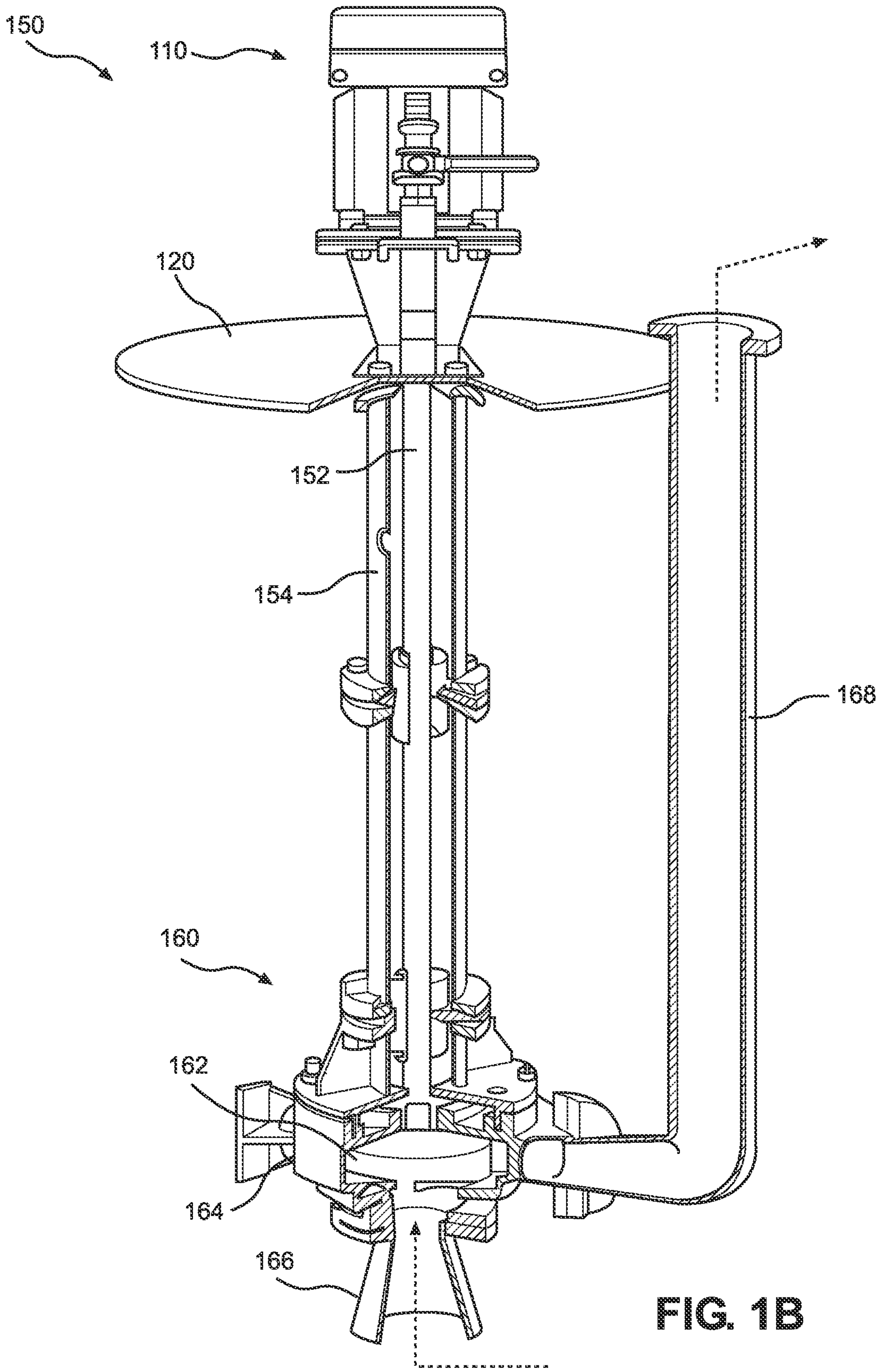
FIG. 1B shows additional detail of a fluid conduit assembly of the separator apparatus with vertical pump.
Figure 2A:
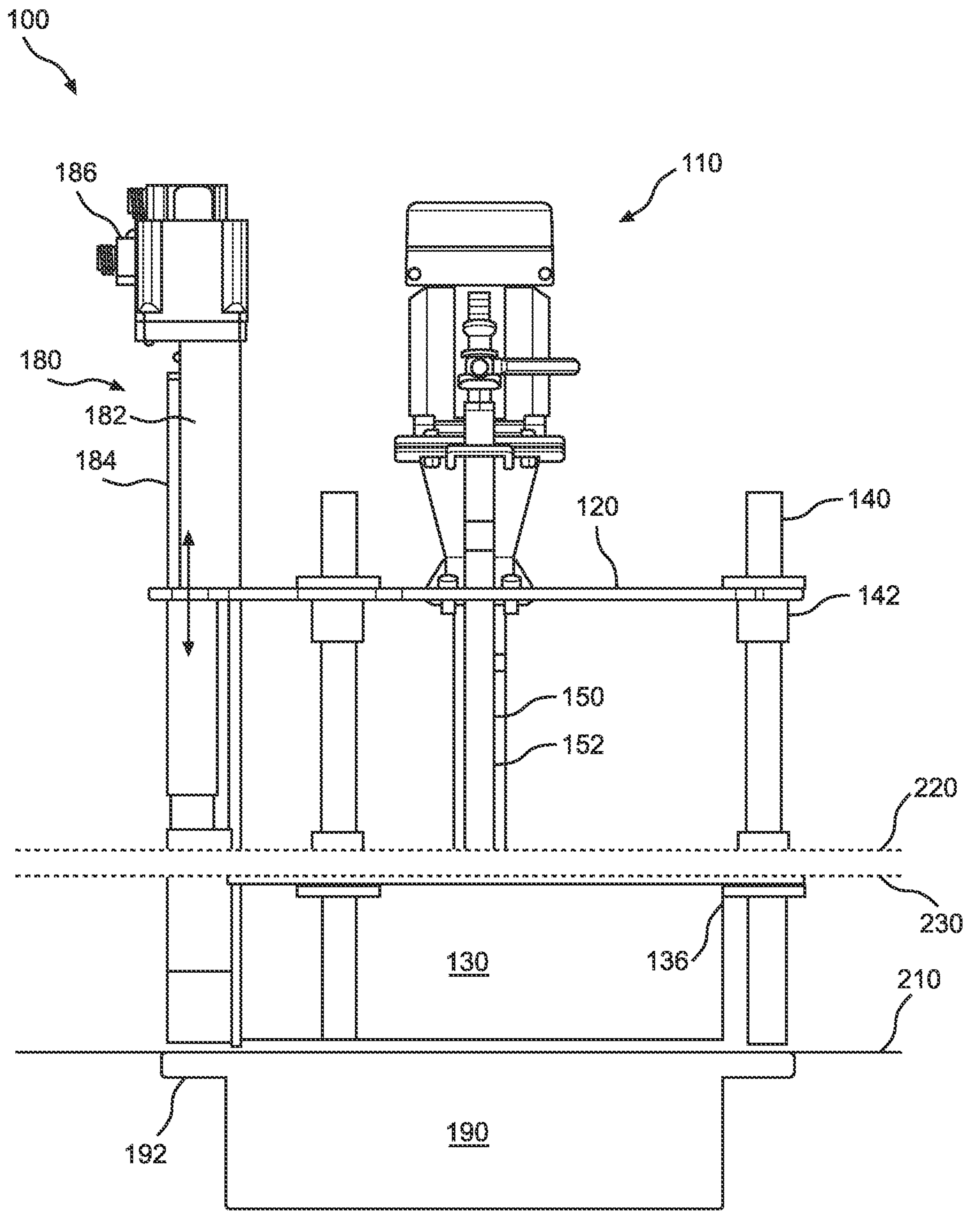
FIGS. 2A-2E show an exemplary separator apparatus' height adjustment with a sump receptacle.
Figures 2B, 2C, 2D, 2E:
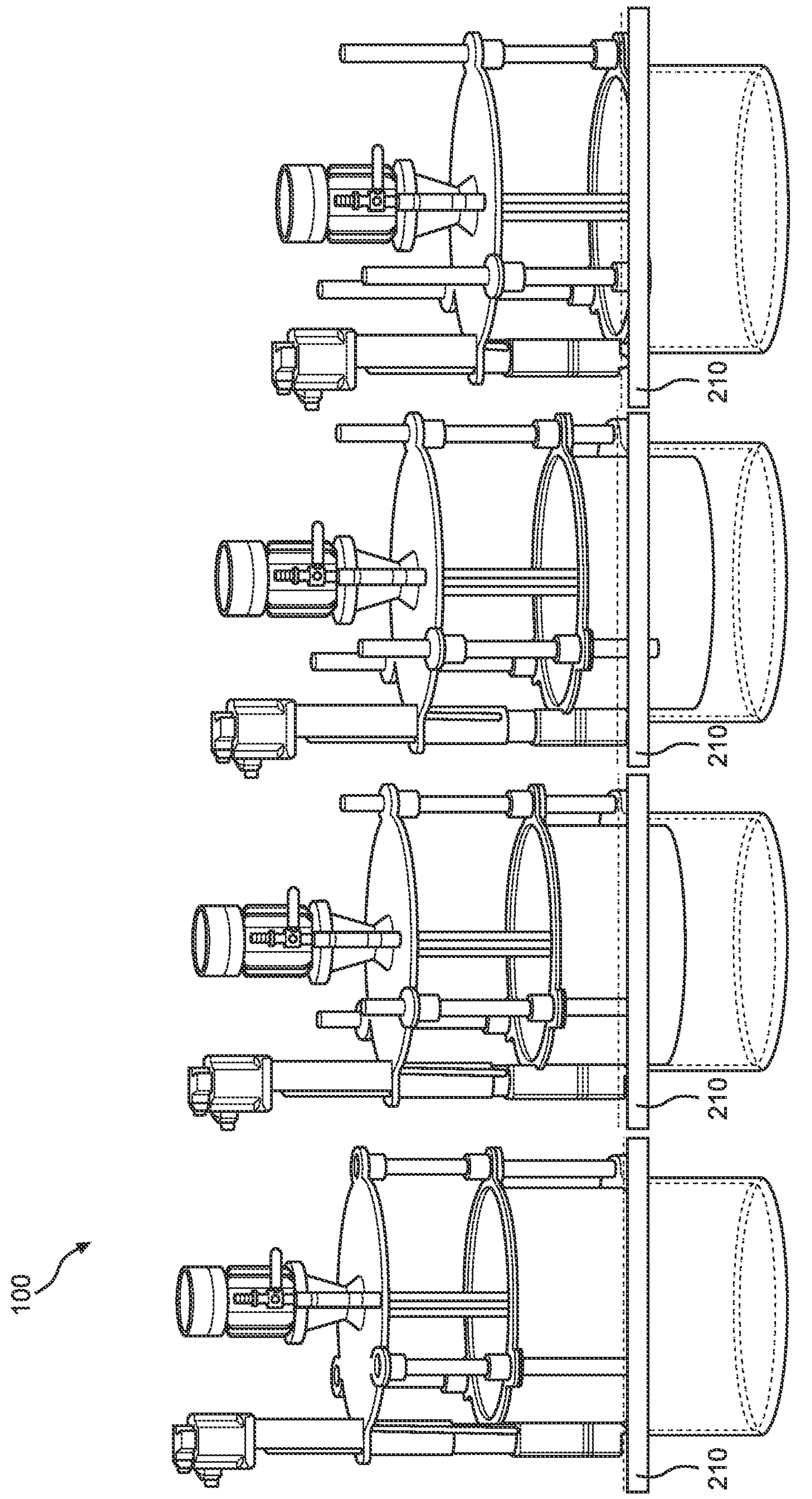

For the vertical sump pump embodiment, a fluid conduit assembly 150 (shown in FIG. 1A and in cutaway detail in FIG. 1B) comprises a rotatable vertical drive shaft 152 located within drive shaft housing 154 and is connected to pump 110 through an opening in mounting plate 120 at its upper first end and extends downward and is coupled at its lower second end to an impeller assembly 160 located within the volume of vessel 130. As shown in FIG. 1A, drive shaft 152 and housing 154 of fluid conduit assembly 150 is stabilized within vessel 130 by one or more (three are shown) adjustable stabilizer arms 170 that fix the impeller assembly 160 height above the inside bottom 134 of vessel 130 which may be nominally one or more inches gap spacing. Additionally, stabilizer arms 170 outer ends may be adjusted within vessel 130 with fasteners 172 comprised of a receiving slot or other fixture located on the inner wall of vessel 130 which allows stabilizer arms 170 to be placed at varying vertical positions, thereby adjusting the height of impeller assembly 160.

Drive shaft 152 is typically housed within drive shaft housing 154 and is rotated within the housing by pump 110 which in turn drives an impeller 162 housed within housing 164 of impeller assembly 160. Impeller housing 164 includes an inlet intake 166 and a discharge conduit 168 for discharging the withdrawn less dense fluid typically to a holding tank (not shown) located outside the containment area.

Discharge conduit 168 may be comprised of a flexible hose or rigid pipe. In certain embodiments, discharge conduit 168 may also be configured to independently draw the fluid from the vessel. In this approach, discharge conduit 168 may allow a remote pump to be utilized either as a bypass or backup to pump 110. Further, conduit 168 may be also routed separately into the vessel 130 in addition to impeller housing 164 and thus include one or more automated or manual valves to divert the flow to a secondary or auxiliary pump (see FIG. 6).

Returning to FIG. 1A, a height adjustment assembly 180 adjusts the vertical position of vessel 130. Height adjustment assembly 180 may be comprised a vertical member 182 which is coupled to vessel 130 and/or mounting plate 120. In certain embodiments, the upper edge of vessel 130 includes a flange 136 that receives one or more (three are shown) guide shafts 140 that permit the vertical position of vessel 130 and/or mounting plate 120 to be slidably adjusted higher or lower. Collars 142 that include bearings or races may be coupled to mounting plate 120 and/or flange 136 of vessel 130 and slidably communicate with guide shafts 140 to facilitate the raising or lowering of vessel 130. In preferred embodiments, both the mounting plate 120 and vessel 130 are affixed to vertical member 182 such that the two move in tandem, but in other embodiments, the pump position is fixed and only the vessel raises or lowers. In yet other embodiments, the pump 110 may move separately in order to adjust the vertical height from which it withdraws the less dense fluid from within vessel 130.

As shown in the embodiment of FIG. 1A, vertical member 182 is comprised of an actuator piston 184 that is actuated by a motor 186 which may be an AC servo motor as shown. In other embodiments, actuator piston 184 may be a hydraulic cylinder driven by a hydraulic pump either manually or electrically. In yet other embodiments, the vertical member 182 may be a screw type or toothed jack pump which is ratcheted with a manual handle or by an electrical or hydraulic pump.

As shown, AC servo motor 186 adjusts one or more positions and spacings of components of the apparatus and may be fixed to an adjustable leveling system (discussed below). The motorized or hydraulically controlled height adjustment assembly may further be remotely controlled via wired or wireless communication. Height adjustment assembly 180 may also adjust vessel's 130 position within an underground or below grade cavity within the reservoir or containment area floor by lowering or elevating the vessel along guide shafts 140. In the example shown, a sump receptacle 190 having a volumetric cavity sized larger in order to receive vessel 130 is located at least partially below ground or grade level of the containment area. Sump receptacle 190 may be constructed of concrete or metal and thus serve as a stabilizing anchor for separation assembly 100. In this approach, guide shafts 140 may fixedly terminate or rest upon a lip of flange 192 portion of sump receptacle 190.

FIGS. 2A-2E depict an embodiment of the placement and adjustment of vertical sump pump 110 with vessel 130 while using an anchored sump receptacle 190 installed below grade. The starting position is shown in detail in 2D representation as FIG. 2A, where sump receptacle 190 is installed below ground level as indicated by 210. The initial position of the vertical position of the uppermost edge of vessel 130 is above sump receptacle 190 with guide shafts 140 lower end resting on flange 192 of sump receptacle 190. This starting position is shown again in 3D representation as FIG. 2B, FIGS. 2C-2E then show the lowering of vessel 130 into position as adjusted by height adjustment assembly 180. In this example, AC servo motor 186 actuates piston 184 of vertical member 182 of assembly 180. The adjustment of vessel 130 is made relative to the level of the less dense fluid 220 which is above the higher density fluid 230 such that the less dense fluid 220 is allowed to flow into the open top 132 of vessel 130. Further, adjusting the height of the vessel allows for varying the flow rate into the vessel of the less dense fluid (e.g., oil) located atop the denser fluid (e.g., water).

Figure 3:
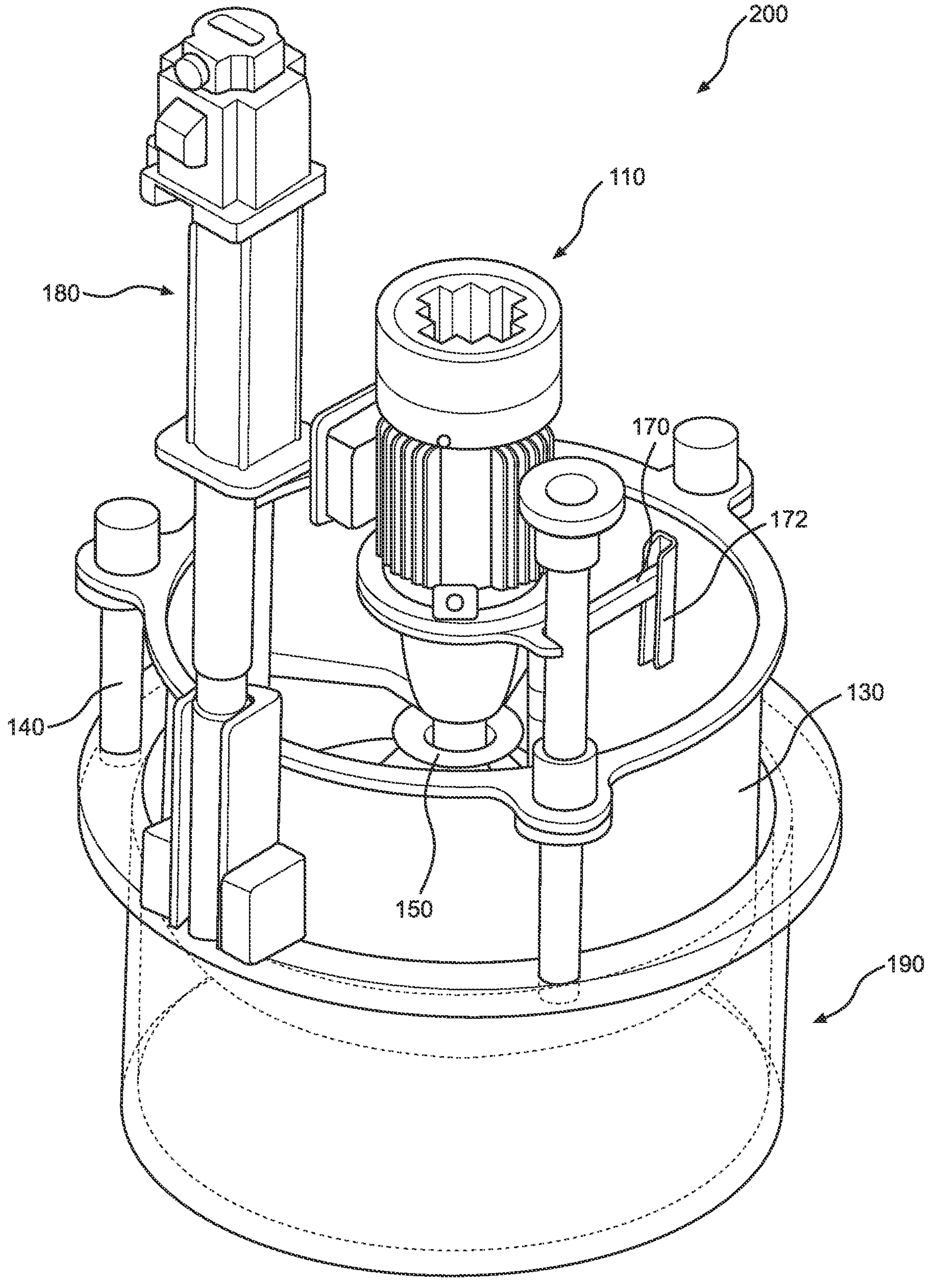
FIG. 3 shows another exemplary separator apparatus with a vertical pump without a mounting plate.

In another embodiment as shown in FIG. 3, separator apparatus 200 may be simplified by mounting pump 110 directly onto stabilizer arms 170 within vessel 130 thus omitting mounting plate 120. This approach then sets the position of fluid conduit assembly 150 within vessel 130. Stabilizer arms 170 outer ends may also be adjusted within vessel 130 with fasteners 172 comprised of a receiving slot or other fixture located on the inner wall of vessel 130 which allows to place stabilizer arms 170 at varying vertical positions.

Figure 4:
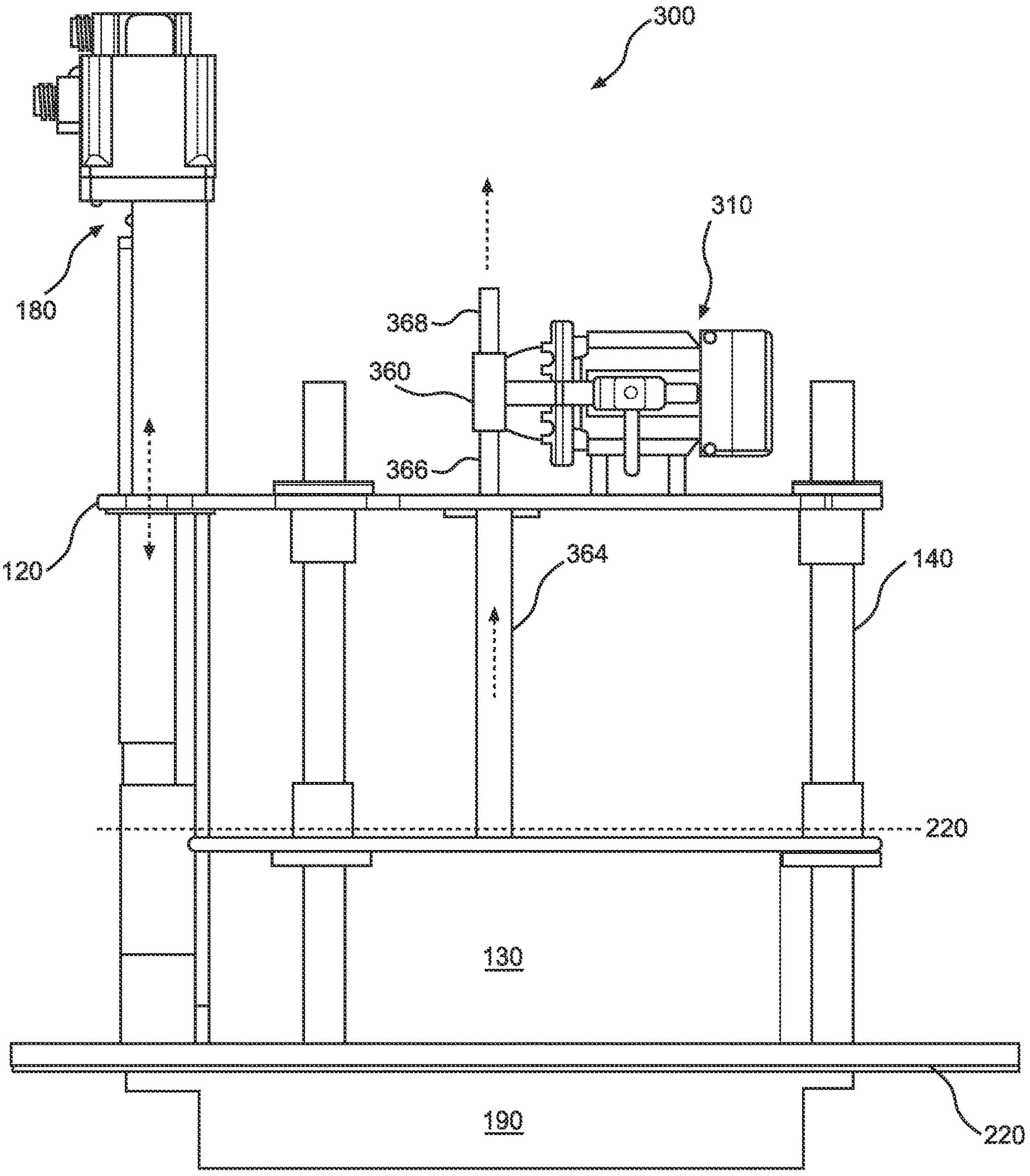
FIG. 4 shows another exemplary separator apparatus with a horizontal pump.

As mentioned above, the vertical sump pump 110 may be exchanged for other types of pumps, for example, a horizontally installed pump 310 such as shown in FIG. 4. In this approach, horizontal pump 310 of apparatus 300 is affixed to mounting plate 120 and has an impeller 360 installed directly onto the pump and draws the less dense fluid up from vessel 130 via conduit 364 into inlet intake 366 and then discharges the fluid through outlet 368. The advantage of this arrangement is a simplified apparatus with the disadvantage of a need to prime the pump in the event vessel 130 is empty prior to a need for separation.

Figure 5:
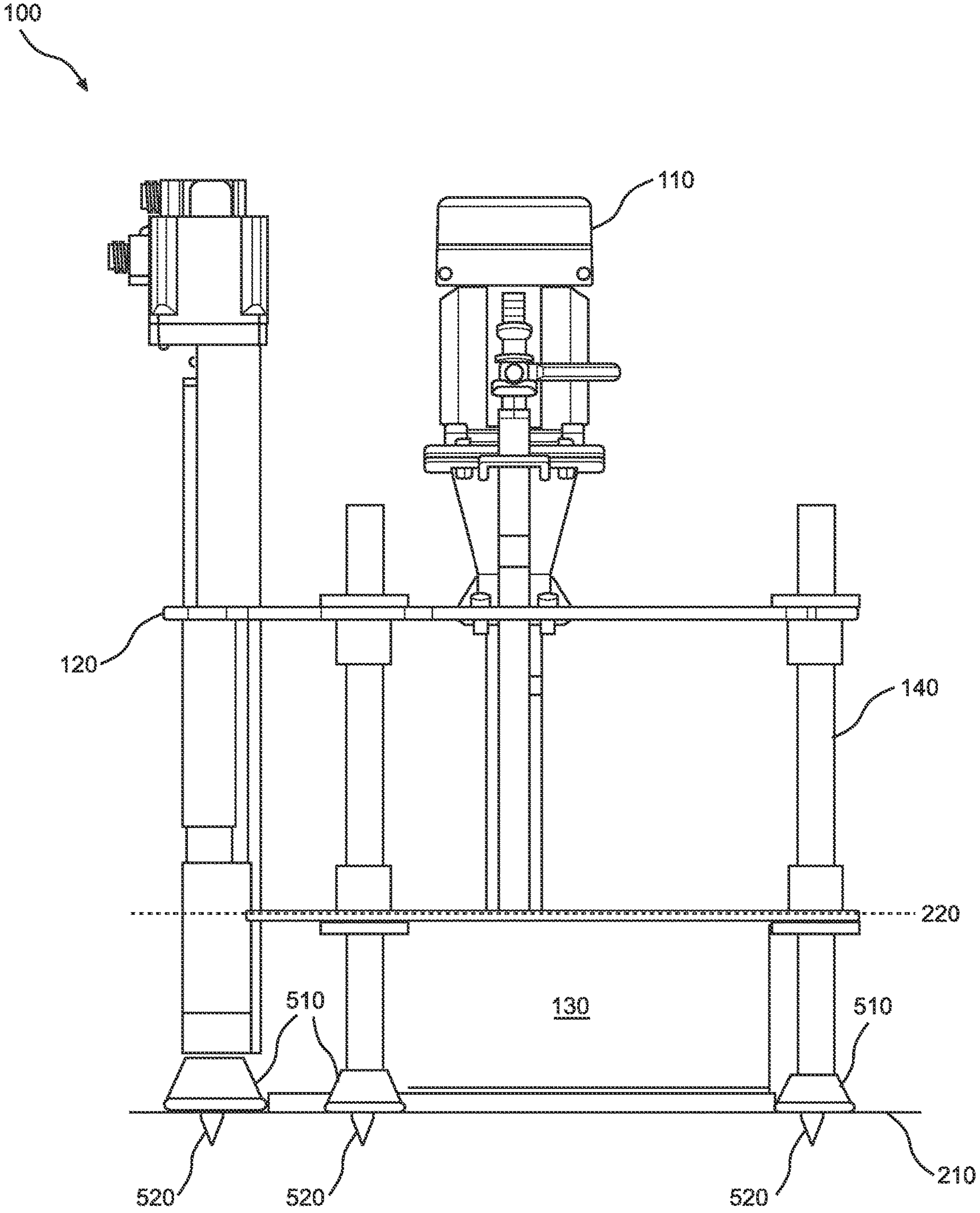
FIG. 5 shows an exemplary separator apparatus with stabilizer feet and anchors.

In yet other embodiments, the containment area that contains the fluid to be separated may be, for example, a tank or concrete enclosure where it may be impractical or undesirable to locate sump receptacle 190 below ground or below grade. In such applications, the separation apparatus 100/200/300 disclosed herein may be comprised of a vessel 130 that rests on or above ground of grade level. FIG. 5 shows exemplary separation apparatus 100 that includes anchor feet 510 coupled to the lower ends of guide shafts 140. Feet 510 may be permanently affixed to the ends of guide shafts 140 by e.g. screws or welds, but in preferred embodiments, anchor feet 510 may be threaded onto guide shafts 140. Thus, threaded feet 510 are also suitable for leveling apparatus 100 upon uneven ground if each foot 510 is threaded onto its guide shaft 140 to varying degree as needed to level the apparatus. In other embodiments, anchor feet 510 may optionally further comprise spikes or other protrusions 520 intended to be driven into the ground to provide additional stabilization of the separation apparatus. Such anchors 520 may be constructed as a permanent part of foot body 510 or an orifice may be provided in the body of foot 510 such that a spike may be driven through it and into the ground. Also shown in the embodiment of FIG. 5, the lower end of vertical member 182 of height adjustment assembly 180 may also include an optional anchor foot 510, however it is to be understood that in other embodiments, height adjustment assembly may not extend to the ground level.

In an additional aspect, there is provided a method of separating from each other a volume of a less dense fluid lying atop a second volume of a denser fluid in a contained space. This exemplary method includes at least the steps of providing a vessel configured to contain a fluid with a closed bottom and a top open to receive fluid into the vessel, providing a pump in fluid communication with the vessel, adjusting the vertical height of the vessel via use of a height adjustment assembly which comprises a vertical member mechanically coupled to the vessel, and when the separation apparatus is in use, a volume of less dense fluid from on top a denser fluid flows into the vessel and the less dense fluid is withdrawn out of the vessel by the pump.

In another exemplary method, the step of providing a vessel may include providing a fluid conduit assembly comprising a vertical drive shaft connected to the pump at a first end and connected at the second end to an impeller assembly having an inlet intake and a discharge conduit, wherein the impeller assembly is located within the volume of the vessel.

In either the foregoing or other embodiments, the step of providing a skimmer vessel may include providing a sump receptacle having a volumetric cavity sized to receive the vessel and the sump receptacle is located at least partially below ground or grade level of the containment area.

In other embodiments, the method may include one or combination of the steps of providing a plurality of guide shafts which are in mechanical communication with the vessel and slidably raising or lowering the vessel along the guide shafts; mounting the pump to a mounting plate located above the vessel; providing a plurality of guide shafts further comprised of feet and/or anchors at lowermost ends, and/or providing any additional features or elements described herein.

Figure 6:
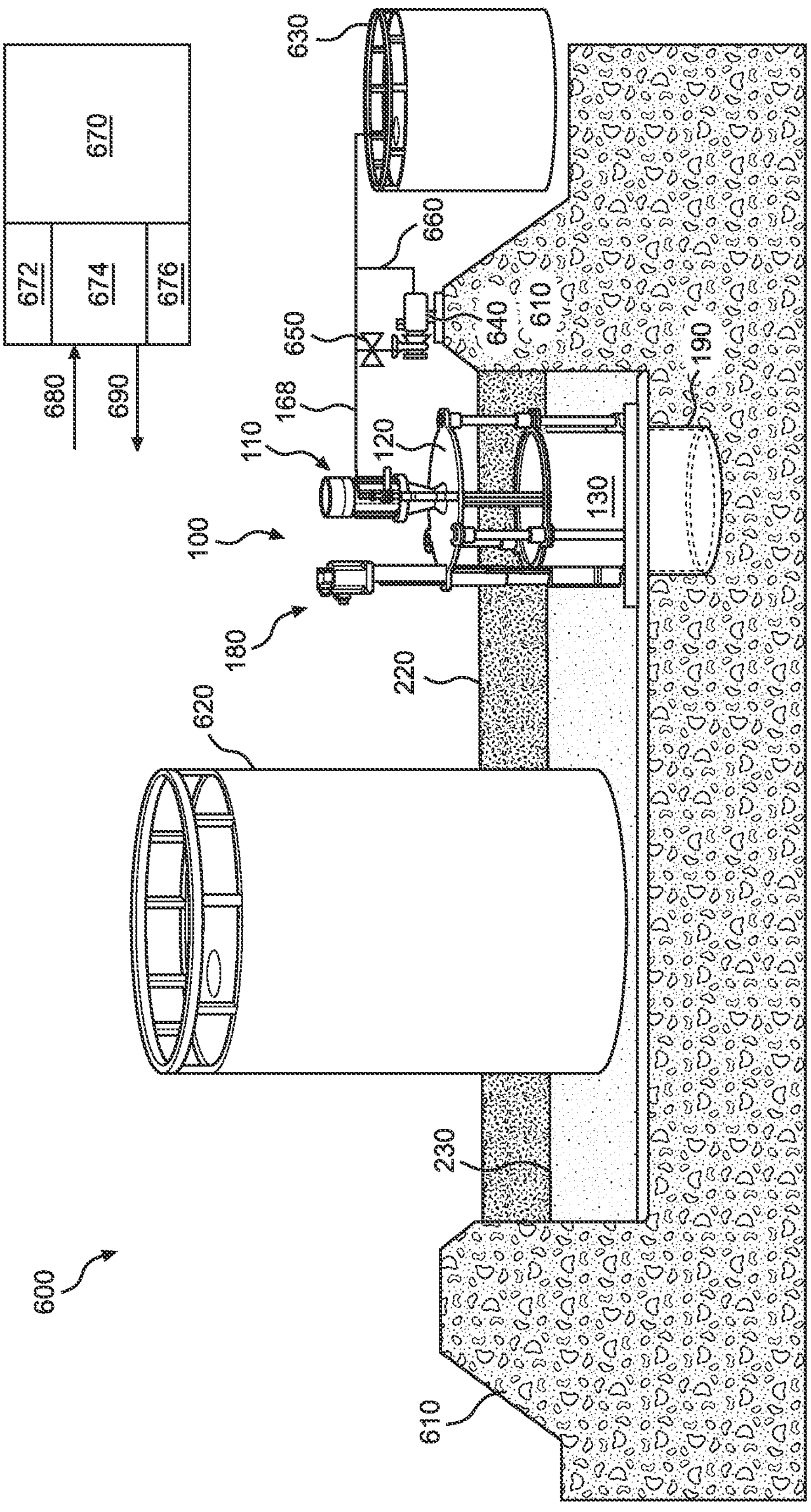
FIG. 6 shows an exemplary system for a field operation of a separator apparatus.

FIG. 6 provides a schematic of a system 600 for an exemplary field application of the separator apparatus and methods disclosed herein. In this example, a holding tank 620 is surrounded by a firewall or berm 610 to create a containment area for collection of leaked or overflowed fluid, which in this example is comprised of a less dense fluid (e.g., oil) 220 that floats atop of more dense fluid (e.g., water) 230. Sump receptacle 190 is installed in this example below grade level of the containment area and is thus configured to receive vessel 130 of separator apparatus 100. A vertical pump 110 is shown as mounted on mounting plate 120 above in this example and includes a fluid conduit assembly 150 and height adjustment assembly 180. In operation, piston 184 of vertical member 182 is actuated by an AC servo motor 186 to set the height of the upper edge of vessel 130 such that it is below the upper surface of less dense fluid 220. Pump 110 is activated and withdraws the oil from vessel 130 and discharges it via discharge conduit 168 to a collection tank 620 located outside the containment area. In other embodiments, holding tank 620 may be located outside the firewall 610 and connected by a pipe to the containment area within the firewall and similarly, collection tank 620 may be located within the containment area or on a truck outside the containment area. Also shown are optional auxiliary pump 640 along with one or more necessary valves 650 and lines 660 to implement pump 640 as a secondary or backup means to withdraw fluid 220 from vessel 130 utilizing discharge line 168 or separate dedicated line.

Also indicated in FIG. 6 is a central control system 670 comprising an internal or external power supply 672, input/output interface 674, transmission system 676, and a computer implemented Programmable Logic Controller (PLC) or other algorithm or controller type 678 that is configured to receive one or more inputs 680 and output one or more control outputs 690 via wired or wireless transmission. Examples of inputs 680 may include parameter information from sensors for detecting leaks or the presence of fluid, fluid levels, temperature, pressure and flow rates, as well as pump states, RPMs, discharge flow rates etc. Outputs 690 may include signals to start-stop pumps, actuate height adjustment, open-close and modulate valves, among others. Central control system 670 may also include the ability to communicate remotely via WIFI, cellular to satellite signal to enable remote monitoring and control of the separator system by secure dedicated signal or the internet.

In the preceding application example, separator apparatus 100 is illustrated as one embodiment of the apparatus, system and method employed, however, it is to be understood that other embodiments of pumps and devices as discussed herein and others foreseeable by those skilled in the art having the benefit of this disclosure are similarly employed and are readily contemplated herein.

It is the object of the present invention to preferentially remove low density fluids which have collected on top of higher denser fluids within a reservoir, container, containment region or other contaminated area simply and inexpensively. The invention allows for the removal of substantially all of a lower density fluid volume from the target area without emptying the entire contents of the total volume which would include the higher density fluids, for example, a layer of contaminant oil from atop of volume of water. Relative to other sump pump-based removal devices, the instant device and system is superior due to the speed in which the removal occurs and the targeted removal of all or nearly all of the low-density fluid in a customizable system.

While examples of embodiments of the technology have been presented and described in text and some examples also by way of illustration, it will be appreciated that various changes and modifications may be made in the described technology without departing from the scope of the inventions, which are set forth in and only limited by the scope of the appended claims.

What is claimed is:

1. A separation apparatus for removing a volume of less dense fluid from the top of a denser volume of fluid, the apparatus comprising:

a vessel configured to contain a fluid with a closed bottom and a top open to receive fluid into the vessel;

a sump receptacle having a volumetric cavity sized to receive the vessel wherein said sump receptacle is located at least partially below ground or grade level of a containment area;

a pump in fluid communication with the vessel;

a height adjustment assembly comprising a vertical member coupled to the vessel and configured to adjust the vertical position of the vessel; and wherein when the separation apparatus is in use, a volume of less dense fluid from on top a denser fluid flows into the vessel and said less dense fluid is pumped out of the vessel by the pump.

2. The separation apparatus of claim 1, wherein the pump is affixed to a flat mounting plate positioned above the vessel.

3. The separation apparatus of claim 1, wherein the pump is comprised of a vertical sump pump.

4. The separation apparatus of claim 1, wherein the height adjustment assembly adjusts the vertical position of the vessel within the sump receptacle.

5. The separation apparatus of claim 1 further comprising a plurality of guide shafts in mechanical communication with the vessel wherein the vessel is slidably raised or lowered along the guide shafts.

6. The separation apparatus of claim 5, wherein the plurality of guide shafts further comprise feet or anchors at lowermost ends.

7. The separation apparatus of claim 1, wherein the height adjustment assembly vertical member is a piston actuated by an electrical motor.

8. A separation apparatus for removing a volume of less dense fluid from the top of a denser volume of fluid, the apparatus comprising:

a vessel configured to contain a fluid with a closed bottom and a top open to receive fluid into the vessel;

a pump in fluid communication with the vessel;

a fluid conduit assembly comprising a vertical drive shaft connected to the pump at a first end and connected at a second end to an impeller assembly having an inlet intake and a discharge conduit, wherein the impeller assembly is located within the volume of the vessel;

a height adjustment assembly comprising a vertical member coupled to the vessel and configured to adjust the vertical position of the vessel; and wherein when the separation apparatus is in use, a volume of less dense fluid from on top a denser fluid flows into the vessel and said less dense fluid is pumped out of the vessel by the pump and fluid conduit assembly.

9. The separation apparatus of claim 8, wherein the pump is affixed to a flat mounting plate positioned above the vessel.

10. The separation apparatus of claim 8, wherein the pump is comprised of a vertical sump pump.

11. The separation apparatus of claim 8 further comprising a sump receptacle having a volumetric cavity sized to receive the vessel wherein said sump receptacle is located at least partially below ground or grade level of a containment area.

12. The separation apparatus of claim 11, wherein the height adjustment assembly adjusts the vertical position of the vessel within the sump receptacle.

13. The separation apparatus of claim 8 further comprising a plurality of guide shafts in mechanical communication with the vessel wherein the vessel is slidably raised or lowered along the guide shafts.

14. The separation apparatus of claim 13, wherein the plurality of guide shafts further comprise feet or anchors at lowermost ends.

15. The separation apparatus of claim 8, wherein the height adjustment assembly vertical member is a piston actuated by an electrical motor.

16. A separation system for removing a volume of less dense fluid from the top of a denser volume of fluid, the system comprising:

a separator apparatus comprising a vessel configured to contain a fluid with a closed bottom and a top open to receive fluid into the vessel; a pump in fluid communication with the vessel; a height adjustment assembly comprising a vertical member coupled to the vessel and configured to adjust the vertical position of the vessel;

a collection tank;

a discharge conduit configured to discharge fluid from the vessel to the collection tank;

a control system comprised of a computer implemented controller configured to receive at least one sensor input associated with the separator apparatus and output at least one control signal; and wherein when the separation system is in use, the control system adjusts the height of the vessel such that a volume of less dense fluid from on top a denser fluid flows into the vessel and activates the pump to withdraw the less dense fluid out of the vessel based upon at least one input command.

17. The separation system of claim 16 further comprising a sump receptacle having a volumetric cavity sized to receive the vessel wherein said sump receptacle is located at least partially below ground or grade level of a containment area.

18. The separation system of claim 16 further comprising a fluid conduit assembly comprising a vertical drive shaft connected to the pump at a first end and connected at a second end to an impeller assembly having an inlet intake and a discharge conduit, wherein the impeller assembly is located within the volume of the vessel.

19. The separation system of claim 16 further comprising a plurality of guide shafts in mechanical communication with the vessel wherein the vessel is slidably raised or lowered along the guide shafts.

* * * * *